(12) United States Patent
Tarquini

(10) Patent No.: US 7,472,167 B2
(45) Date of Patent: Dec. 30, 2008

(54) SYSTEM AND METHOD FOR UNIFORM RESOURCE LOCATOR FILTERING

(75) Inventor: Richard P. Tarquini, Apex, NC (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1508 days.

(21) Appl. No.: 10/004,192

(22) Filed: Oct. 31, 2001

(65) Prior Publication Data

US 2003/0093517 A1 May 15, 2003

(51) Int. Cl.
*G06F 15/16* (2006.01)
(52) U.S. Cl. .......................... 709/217; 709/218; 707/10
(58) Field of Classification Search ................. 709/201, 709/203, 217, 219, 228, 229, 218; 707/10
See application file for complete search history.

(56) References Cited

U.S. PATENT DOCUMENTS

| | | | | |
|---|---|---|---|---|
| 5,319,779 A | * | 6/1994 | Chang et al. | 707/3 |
| 5,996,011 A | * | 11/1999 | Humes | 709/225 |
| 6,374,260 B1 | * | 4/2002 | Hoffert et al. | 707/104.1 |
| 6,631,369 B1 | * | 10/2003 | Meyerzon et al. | 707/4 |
| 6,647,421 B1 | * | 11/2003 | Logue et al. | 709/226 |
| 6,745,367 B1 | * | 6/2004 | Bates et al. | 715/500 |
| 6,772,214 B1 | * | 8/2004 | McClain et al. | 709/229 |
| 6,816,900 B1 | * | 11/2004 | Vogel et al. | 709/225 |
| 2002/0054167 A1 | * | 5/2002 | Hugh | 345/854 |
| 2002/0087573 A1 | * | 7/2002 | Reuning et al. | 707/102 |

OTHER PUBLICATIONS

Fisher, Dennis; "A lliance Takes on DDoS"; eWeek, Aug. 17, 2001; pp. 1, 2.

* cited by examiner

*Primary Examiner*—Ario Etienne
*Assistant Examiner*—Sargon N Nano

(57) ABSTRACT

A system and method for Uniform Resource Locator (URL) filtering is disclosed. The method comprises receiving an event notification upon the occurrence of an event associated with a received URL; searching, in response to the event notification, a lexical search tree data structure storing a plurality of URLs for the received URL; and processing the received URL in response to the received URL not matching any of the plurality of URLs stored in the lexical search tree data structure.

21 Claims, 6 Drawing Sheets

SYSTEM AND METHOD FOR UNIFORM RESOURCE LOCATOR FILTERING

RELATED APPLICATIONS

The present patent application is related to concurrently filed U.S. patent application Ser. No. 10/002,381, entitled, "SYSTEM AND METHOD FOR SEARCHING A SIGNATURE SET FOR A TARGET SIGNATURE", the disclosure of which is incorporated herein by reference.

TECHNICAL FIELD OF THE INVENTION

The present invention relates generally to intrusion detection and more particularly to a system and method for Uniform Resource Locator (URL) filtering.

BACKGROUND OF THE INVENTION

Computer system security issues have become extremely important as more and more computers are connected to networks, like the Internet. Attacks on computer systems have become increasingly sophisticated due to the evolution of new hacker tools.

In response to more sophisticated attacks, new intrusion detection systems (IDS) are being developed and deployed to monitor and prevent attempts to intrude into computer networks. Intrusion detection systems attempt to identify unauthorized or malicious attempts against a computer system or network of computer systems. An IDS may comprise one or more event generation mechanisms that report identifiable events to one or more management facilities. A countermeasure mechanism may also be included within the IDS for executing an action intended to thwart or negate a detected event.

Applications including hostile attack applications responsible for transmitting data across a network medium will often have a distinctive signature within the transmitted data. The signature may comprise recognizable data that is contained within one or more packets. Signature analysis is often performed by the IDS. A signature analysis algorithm may search for a particular string that has been identified as associated with a hostile application. Once the string is identified within a network data stream, the one or more packets carrying the string may be identified as 'hostile' or exploitative, and the IDS may then perform any one or more of a number of actions, such as logging the identification of the string, performing a countermeasure, or simply ignoring the string.

In general, an IDS will scan received packets for an occurrence of a given signature included within a plurality of known attack signatures. Because the signature analysis is performed in real time, that is as the packets are received, performance is critical because positive identifications may require proactive actions on the part of the IDS.

SUMMARY OF THE INVENTION

In accordance with an embodiment of the present invention, a method for Uniform Resource Locator (URL) filtering is disclosed. The method comprises receiving an event notification upon the occurrence of an event associated with a received URL; searching, in response to the event notification, a lexical search tree data structure storing a plurality of URLs for the received URL; and processing the received URL in response to the received URL not matching any of the plurality of URLs stored in the lexical search tree data structure.

In accordance with another embodiment of the present invention, a system for URL filtering is disclosed. The system comprises a web server operable to receive a URL request from a client. The system also comprises a filter operable, upon receiving an event notification relating to the URL request from the web server, to search a lexical search tree data structure storing a plurality of URLs for the received URL, the filter further operable to process the received URL in response to the received URL not matching any of the plurality of URLs.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 6 of the drawings, like numerals being used for like and corresponding parts of the various drawings.

A system and method for Uniform Resource Locator (URL) filtering that involves searching a signature set, such as a plurality of URLs, for a target signature, such as a target URL, while reducing the number of comparisons is disclosed.

In the preferred embodiment, a lexical search tree data structure is used to store the data to be searched in a structured and organized way. The data may represent a plurality of signatures of a signature set. The lexical search tree data structure may be implemented in software or hardware. For example, object-oriented programming techniques may be used to implement the lexical search tree data structure. Comparisons between the target signature and the data stored in the lexical search tree are performed to determine whether the lexical search tree data includes the target signature. In the preferred embodiment, this may be accomplished by scanning the target signature only once for comparison with the signature(s) in the signature set instead of scanning it multiple times for comparison with multiple signatures.

A signature may comprise a character string, for example a URL. A character string comprises of one or more characters. Preferably, the characters that may be used in the character strings correspond to the ASCII (American Standard Code for Information Interchange) character set which includes 128 characters, each of which may be denoted by a number from 0 to 127. However, if desired, characters from other types of character sets, such as EBCDIC (Extended Binary-Coded Decimal Interchange Code), extended ASCII, and/or the like, may be in the character strings. The use of characters from other types of character sets is especially useful in the case of URLs that include characters from languages other than English.

Figure 1:
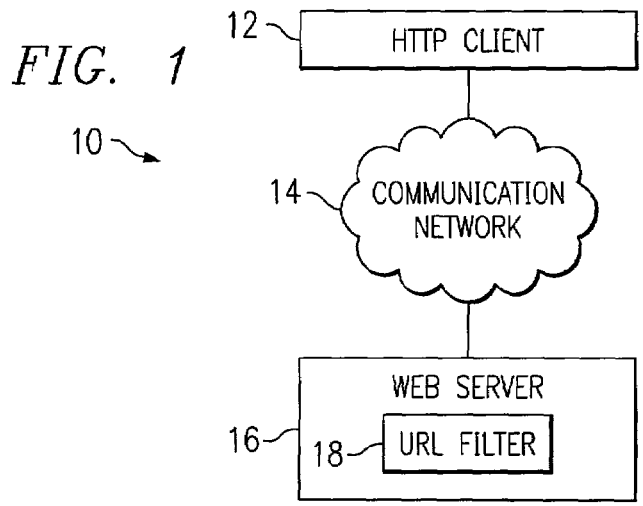
FIG. 1 is a schematic representation of an exemplary network utilizing the preferred embodiment of the present invention.

FIG. 1 is a schematic representation of an exemplary network 10 utilizing the preferred embodiment of the present invention. Network 10 comprises a client 12, such as a Hyper Text Transfer Protocol (HTTP) or HTTPS client, for example an Internet browser. Network 10 also comprises a web server 16, such as an Internet Information Server (IIS), an Apache web server, and/or the like. Web server 16 preferably includes an operating system, such as Windows2000®, WindowsNT®, LINUX®, UNIX®, and/or the like. Web server 16 receives HTTP requests from client 12 via a communication network 14. Each HTTP transaction between client 12 and web server 16 may trigger one or more events. Communication network 14 may be a global computer network, such as the Internet.

Web server 16 preferably includes one or more filters. For example, an IIS server typically includes one or more ISAPI (Internet Server Application Programming Interface) filters. In a preferred embodiment of the present invention, web server 16 includes a URL filter 18. URL filter 18 is activated when web server 16 is initialized and preferably remains active until web server 16 is shut down.

Figure 2:
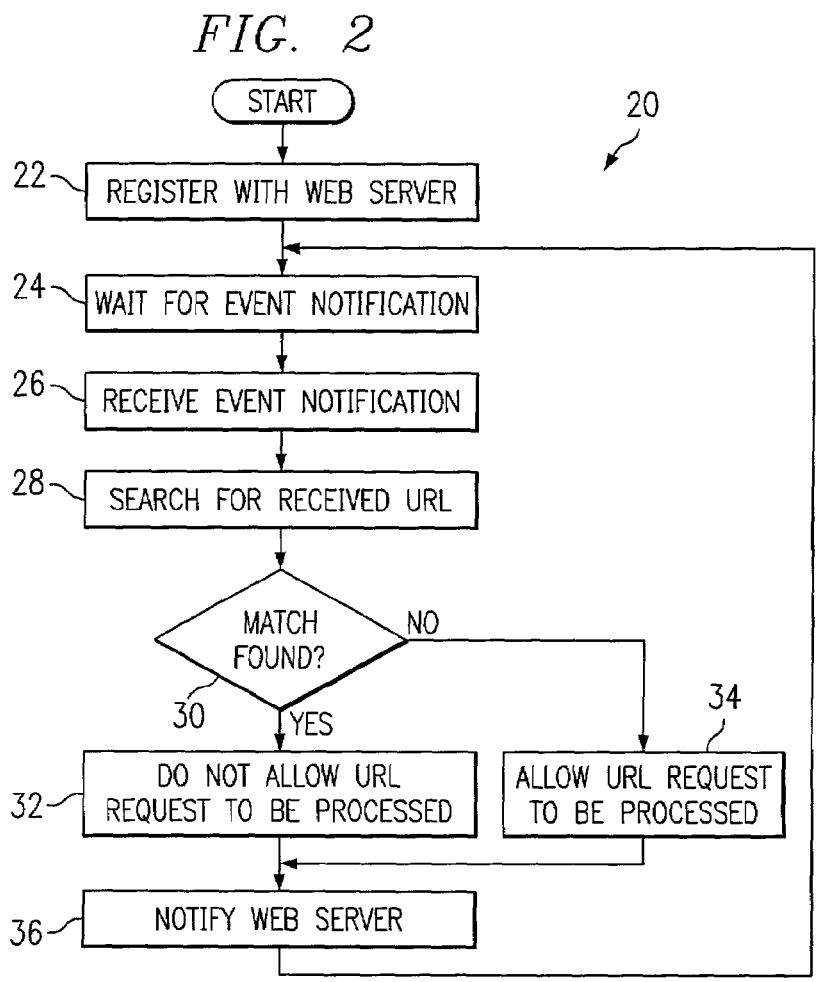
FIG. 2 is a flowchart of a method for URL filtering according to a preferred embodiment of the present invention.

FIG. 2 is a flowchart 20 of a method for URL filtering according to a preferred embodiment of the present invention. In step 22, URL filter 18 registers with web server 16 to receive notification when a particular event occurs. When web server 16 initially loads URL filter 18, web server 16 preferably creates a filter data structure, for example a HTTP_FILTER_VERSION data structure. Web server 16 passes a pointer to the filter data structure to URL filter 18, preferably by calling a filter function, for example a GetFilterVersion function. URL filter 18 preferably uses the filter data structure to register with web server 16 to receive notifications when certain events occur. For example, URL filter 18 may register with web server 16 to receive notifications when a receive raw data event occurs or when a URL map event occurs. A URL map is the association of a received URL with a file on a file server (not shown) associated with web server 16.

Once URL filter 18 has registered with web server 16, it waits to receive event notification from web server 16 (step 24). When a URL map event occurs, web server 16 notifies URL filter 18 of the URL map event (step 26), preferably by calling a filter entry point function, for example a HttpFilterProc function, and passing a notification parameter which preferably points to a data structure storing the received URL.

In step 28, a signature set comprising of a plurality of URLs and stored in a lexical search tree data structure is searched to determine if the received signature, for example the received URL, matches any of the URLs in the signature set. URL filter 18 preferably determines the data structure pointed to by the notification parameter and retrieves the received URL. The search is preferably performed using a method, such as that described herein with reference to FIG. 6. The URLs in the signature set are preferably URLs that are considered hostile. Such URLs may, for example, request access to data that is not intended to be accessible over a public network. In the preferred embodiment, the signature set is stored in a lexical search tree data structure. An exemplary lexical search tree data structure is described herein with reference to FIGS. 3 and 4. A preferred embodiment method for storing multiple strings in the lexical search tree data structure is described herein with reference to FIGS. 5A-5C.

If a match is found, then the URL request is not allowed to be processed (steps 30, 32) thereby filtering the URL request.

If a match is not found, then the URL request is allowed to be processed (steps 30, 34) in a conventional manner. In step 36, URL filter 18 notifies web server 16 of the result of the search. URL filter 18 may also notify web server 16 that it is ready for the next event. Preferably, URL filter 18 passes a flag to web server 16 notifying web server 16 of the result of the search. The process starting at step 24 is preferably repeated until web server 16 is shut down.

Figure 3:
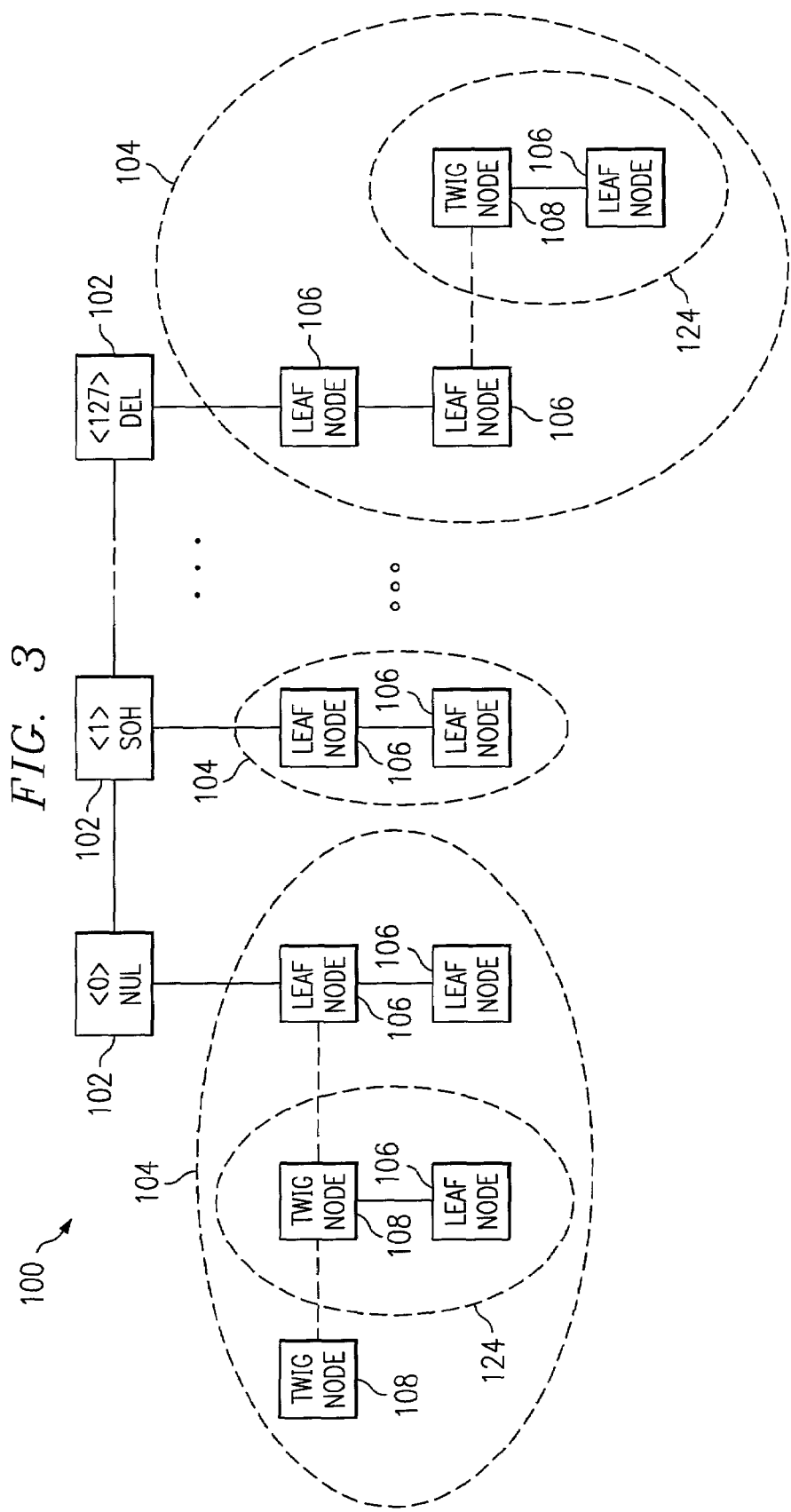
FIG. 3 is a diagram of an exemplary lexical search tree data structure according to a preferred embodiment of the present invention.

FIG. 3 is a diagram of an exemplary lexical search tree data structure 100 according to a preferred embodiment of the present invention. Lexical search tree 100 comprises a plurality of root nodes 102 and a plurality of branches 104. Preferably, the number of root nodes 102 in lexical search tree 100 is equal to the total number of characters in the character set used to represent the character strings, for example URLs. Each root node preferably corresponds to a character from the character set. Each of the root nodes 102 includes a hash value for a particular character in the character set. Thus, when characters from the ASCII character set are used in the character strings, the total number of root nodes 102 in lexical search tree 100 is 128. On the other hand, when characters from the extended ASCII character set are used in the character strings, the total number of root nodes 102 in lexical search tree 100 is 256.

Each branch 104 is associated with at least one root node 102. A branch 104 in lexical search tree 100 comprises one or more leaf nodes 106. Branch 104 may also comprise one or more twigs 124. A twig 124 comprises a twig node 108. Twig 124 may also comprise one or more leaf nodes 106. A leaf node 106 is a continuation of a branch 104 or a twig 124 at the next lower level. A twig 124 is a divergence of a branch 104 at a leaf node 106. A twig node 108 is typically the first node of twig 124. Twig node 108 and the leaf node 106 from which it diverges are at the same level in lexical search tree 100. In the FIGURES, a link between a twig node 108 and a leaf node 106 from which it diverges is shown by dotted lines. A leaf node may have multiple twig nodes at the same level as the leaf node. However, in the embodiment illustrated in FIG. 3, a leaf node only has one other leaf node directly linked to it at the next lower level.

Each leaf node 106 and each twig node 108 may be represented by a data object that includes a value field, a leaf node pointer field and a twig node pointer field. The value field contains the character represented by the node. The leaf node pointer field contains a pointer to a leaf node at the next lower level, if any. The twig pointer field contains a pointer to a twig node at the same level, if any.

A branch along with its corresponding root node represents one or more signatures, for example one or more URLs, having a common first character. The common first character in each signature is represented by root node 102 and the other characters in each signature are stored in leaf nodes 106 and/or twig nodes 108. Twig 124 is a substring of a signature whose first character is represented by the corresponding root node. The first character of the substring is stored in the corresponding twig node 108.

Figure 4:
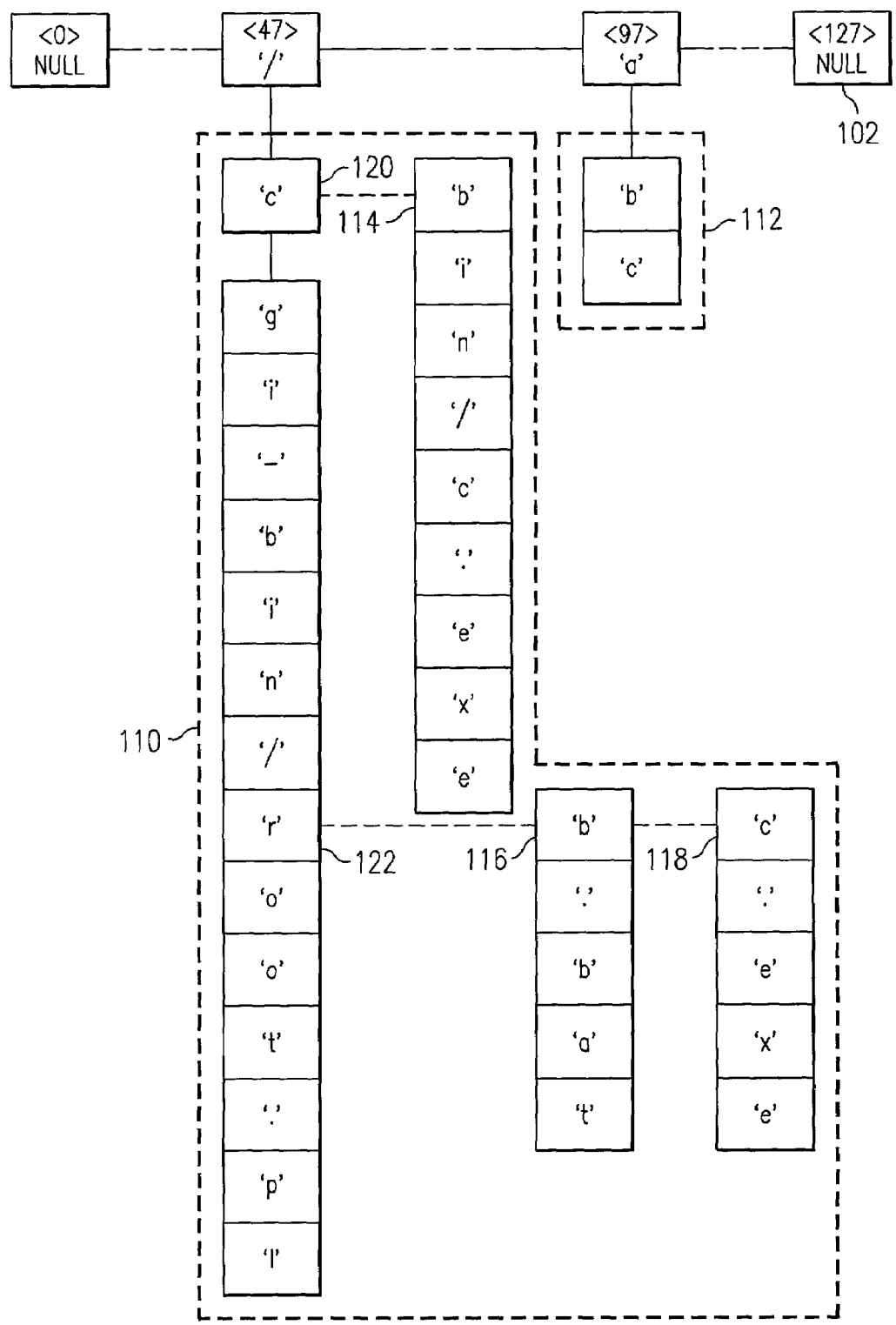
FIG. 4 shows a lexical search tree data structure for an exemplary signature set.

FIG. 4 shows a lexical search tree for an exemplary signature set. The exemplary signature set of FIG. 4 includes five character strings:

character string 1: "/cgi-bin/root.pl"
character string 2: "/cgi-bin/b.bat"
character string 3: "/cgi-bin/c.exe"
character string 4: "/bin/c.exe"
character string 5: "abc"

The lexical search tree of FIG. 4 includes 128 root nodes, each root node corresponding to a character in the ASCII character set. The five character strings have the characters '/' and 'a' as the first character. The hash value for '/' is 47 and the hash value for 'a' is 97. Therefore, in the lexical search tree the root nodes 102 corresponding to the hash value of those two characters do not have NULL pointers. All other root nodes have NULL pointers indicating that there are no character strings in the signature set that have the characters corresponding to those root nodes as the first character.

For character string 5, the next character 'b' is stored in a leaf node at the next lower level to the root node corresponding to 'a'. The last character 'c' in character string 5 is stored in a leaf node at the next lower level than the leaf node for character 'b'. Therefore, branch 112 along with the root node for 'a' to which branch 112 is linked represents character string 5.

Since '/' is the first character for character strings 1 through 4, branch 110 along with the root node for '/' to which branch 110 is linked represents character strings 1 through 4. The leaf nodes in branch 110 are populated in a similar manner to the leaf nodes of branch 112. Furthermore, as the first character of character string 1 and character string 4 are the same but the second character of the two character strings are different, node 114 storing character 'b' of character string 4 is designated as a twig node as character string 4 diverges from character string 1 at leaf node 120. Similarly, nodes 116 and 118 are designated as twig nodes as character string 2 and character string 3 both diverge from character string 1 at leaf node 122.

The signature set may include one or more URLs, such as:
character string 6: http://www.xyz.org
character string 7: https://www.xyz.com In such a case, the root node 102 corresponding to the hash value for 'h' would not have a NULL pointer. For character strings 6 and 7, the next three characters 't', 't' and 'p' are stored in leaf nodes at successive lower levels. For character string 6, the remaining characters ':', '/', '/', 'w', 'w', 'w', '.', 'x', 'y', 'z', '.', 'o', 'r', and 'g' are stored in leaf nodes at successive lower levels. On the other hand, for character string 7, the next character 's' is stored in a twig node diverging from the leaf node which stores character ':' of character string 6. The next character ':' of character string 7 is stored in a leaf node at the next lower level from the twig node and the remaining characters of character string 7, namely, '/', '/', 'w', 'w', '.', 'x', 'y', 'z', '.', 'c', 'o', and 'm' are stored in leaf nodes at successive lower levels starting from the leaf node which stores character ':' of character string 7.

Figure 5A:
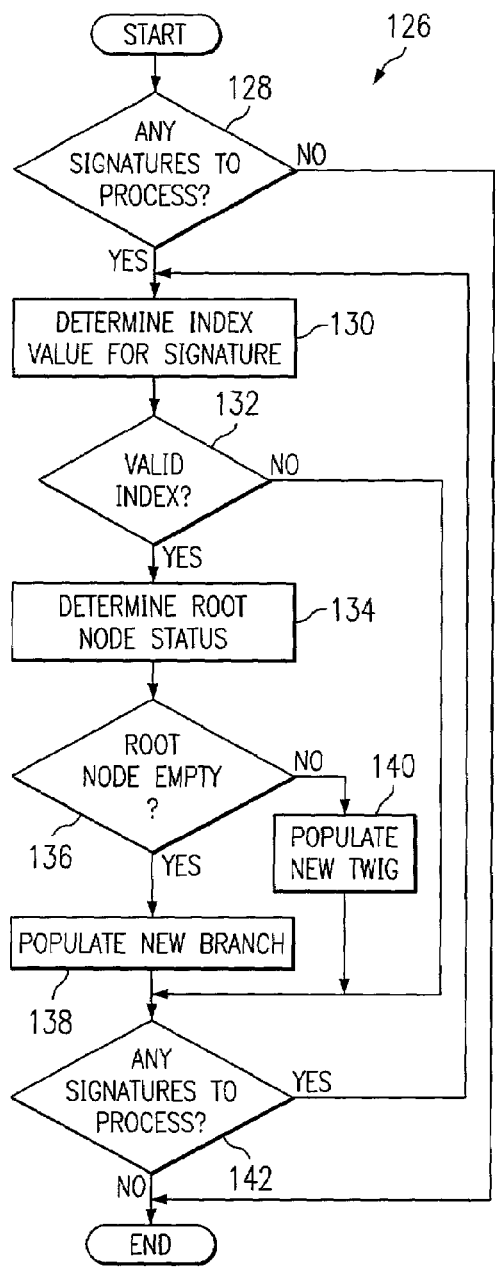
FIGS. 5A-5C are flowcharts of a method for storing multiple strings in a lexical search tree data structure according to a preferred embodiment of the present invention.

FIG. 5A is a flowchart 126 of a method for storing multiple signatures, for example multiple URLs, in a lexical search tree data structure according to a preferred embodiment of the present invention. In step 128, a determination is made as to whether there are any signatures in the signature set to be processed. If there is at least one more signature to be processed, then in step 130 an index value for the next signature to be processed is determined. This may be done, for example, by determining the first character of the signature and determining its hash value. Preferably, the hash value for a character corresponds to its ASCII code value when the character set is the set of ASCII characters. In step 132 the validity of the index value is determined. An index value which is within a predefined set of values is a valid index value. For example, when the character set is the set of ASCII characters, then a value between 0 and 127 is a valid index value.

In step 134, the status of the root node corresponding to the determined index value is determined. This is preferably accomplished by looking up the status of the root node in an index table. The index table includes a hash value for each character in the character set and its corresponding status information. Status information preferably includes information as to whether the root node is empty or not. A root node is considered empty if no other signatures with the same first character as the signature being processed have been stored in the lexical search tree. Status information may also include a pointer to a leaf node linked to the root node. If the root node is empty, then the leaf node pointer is NULL. In step 136, a determination is made as to whether the root node is empty. If the root node is empty then in step 138 a new branch is populated as discussed in more detail with reference to FIG. 5B. If the root node is not empty then in step 140 a new twig is populated as discussed in more detail with reference to FIG. 5C. In step 142, a determination is made as to whether there are any more signatures to be processed. If there are more signatures to be processed then the process starting at step 130 is repeated.

Figure 5B:
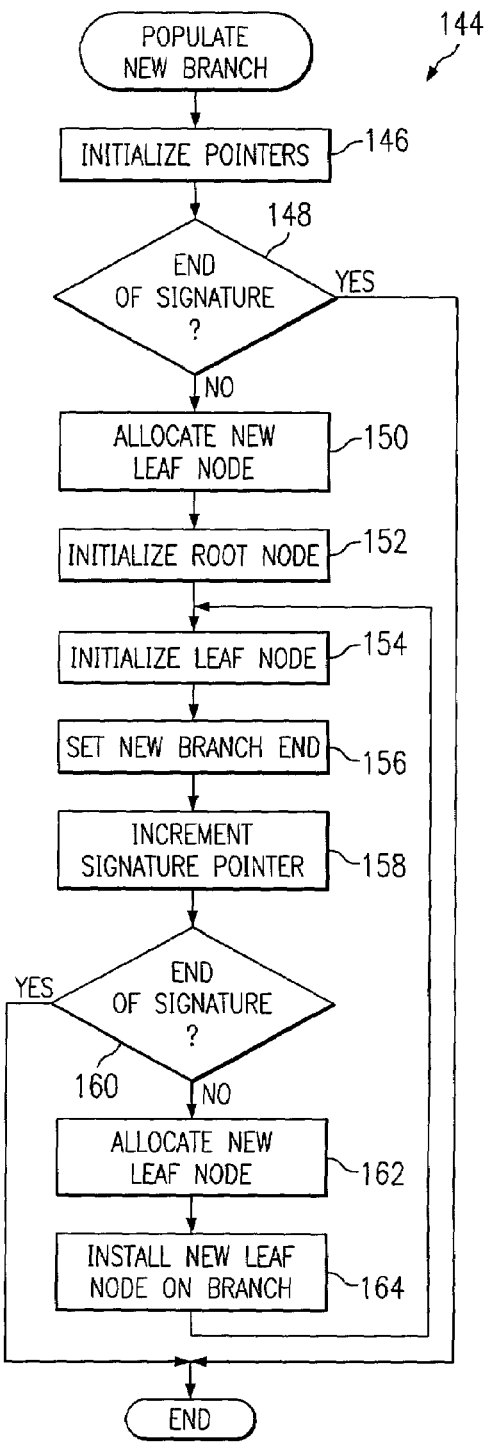

FIG. 5B is a flowchart 144 for populating a branch of the lexical search tree according to a preferred embodiment of the present invention. In step 146, one or more pointers, such as a current node pointer, a signature pointer, and/or the like are initialized. The current node pointer is preferably initialized to NULL. The signature pointer is preferably initialized to point to the second character in the signature, for example the URL, being processed. In step 148, a determination is made as to whether the end of signature has been reached. If the end of signature has not been reached, then in step 150, a leaf node is allocated. As mentioned above, each leaf node includes a value for the node, a leaf node pointer and a twig node pointer. In step 152, the root node is initialized. Preferably, the root node pointer is set to point to the allocated leaf node. In step 154, the allocated leaf node is initialized. Preferably, in this step the value of the character pointed to by the signature pointer is stored in the leaf node. Furthermore, the leaf node pointer and the twig node pointer are set to NULL.

In step 156, the end of the branch from the root node corresponding to the first character of the signature being processed is set to point to the allocated leaf node, preferably by setting the current node pointer to point to the allocated leaf node. In step 158, the signature pointer is incremented to point to the next character in the signature. In step 160, a determination is made as to whether the end of the signature has been reached. If the end of signature has not been reached then in step 162, a new leaf node for the next character is allocated. In step 164, the allocated leaf node is installed on the branch, preferably by setting the leaf node pointer of the current node to point to the allocated leaf.

Figure 5C:
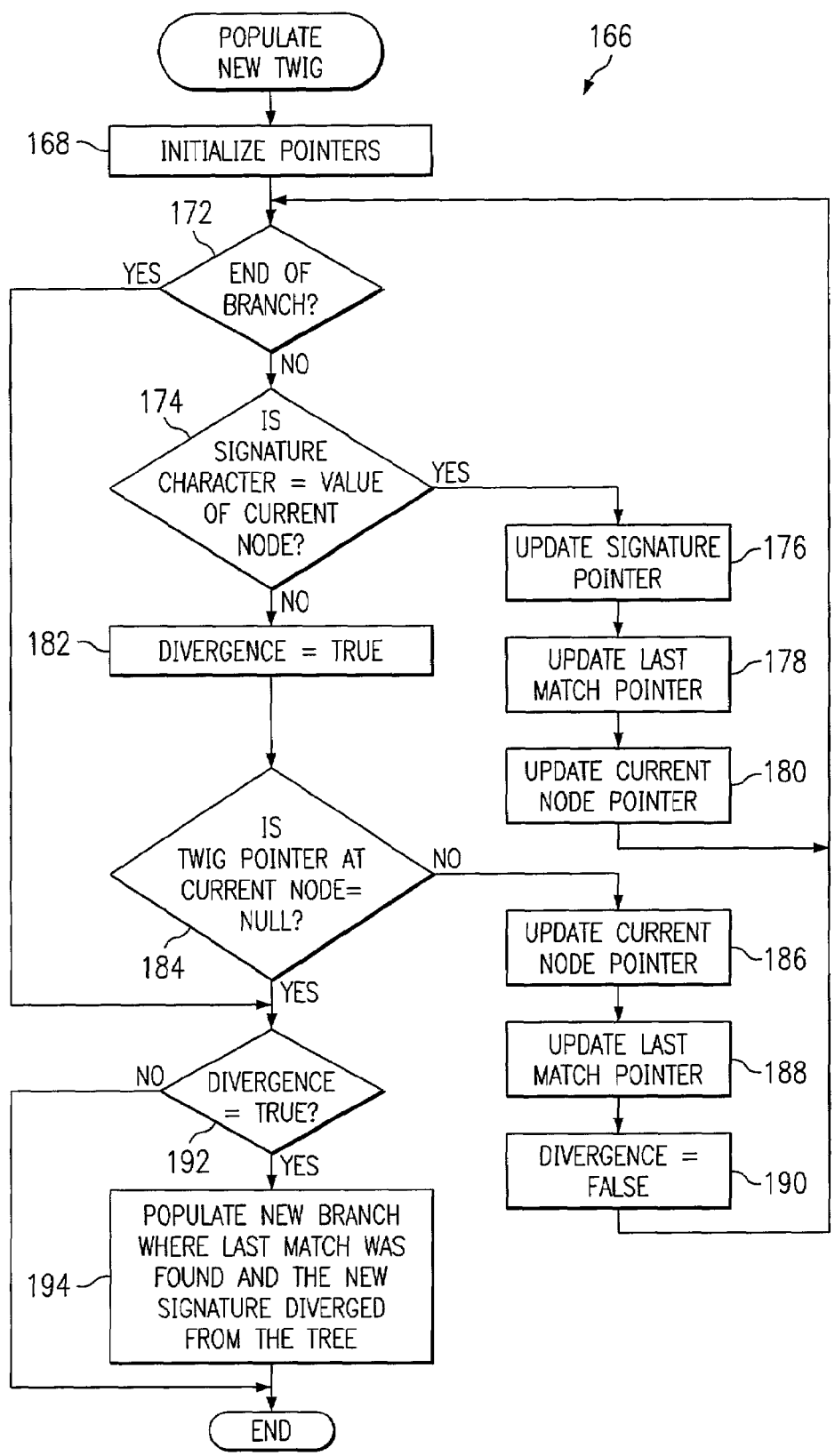

FIG. 5C is a flowchart 166 for populating a twig of the lexical search tree according to a preferred embodiment of the present invention. The method of populating a twig comprises determining the leaf node where the signature being processed, for example a URL, diverges from another signature, for example another URL, in the lexical search tree with a common first character and creating a twig for the non-matching substring from there.

In step 168, one or more pointers, such as a current node pointer, a signature pointer, a last match pointer and/or the like are initialized. The current node pointer is preferably initialized to point to the root node. The last match pointer is preferably initialized to point to the current node.

In step 172, a determination is made as to whether the current node pointer value is NULL. If the current node pointer value is not NULL, then in step 174, a determination is made as to whether the value of the character pointed to by the signature pointer is equal to the value of the current node. If the two values are the same then it indicates that there is no divergence. In step 176, the signature pointer is updated, preferably to point to the next character in the signature, for example the URL being processed. In step 178, the last match pointer is updated, preferably to point to the current node. In step 180, the current node pointer is updated preferably to point to the next node, thereby making the next node the current node. Thus, in steps 178 and 180, the last match pointer is updated to point to the current node and the current node pointer is updated to point to the next node in the lexical search tree.

If in step 174, a determination is made that the value of the character pointed to by the signature pointer is not equal to the value of the current node, then in step 182, a divergence flag is set indicating that the current signature and the signature already stored in the lexical search tree diverge. In step 184, a determination is made as to whether the twig pointer of the node pointed to by the last match pointer is equal to NULL. A twig pointer value that is not NULL indicates that there are other twigs that diverge from the current node. In step 186, the current node pointer is updated preferably to point to the twig of the node pointed to by the last match pointer. In step 188, the last match pointer is updated to point to the current node. In step 190, the divergence flag is reset. The process starting at step 172 is then repeated.

A determination in step 172 that the current node pointer value is NULL indicates that the last node of the lexical search tree has been reached. In step 192 a determination is made as to whether the divergence flag, which indicates a divergence between the signature being processed and a signature having at least the same first character as the signature being processed, is set. If the divergence flag is set, then in step 194, a new branch is populated starting from the node where the last match was found and the signature to be inserted diverged from the lexical search tree. For this purpose, the method described with reference to FIG. 5B for populating a branch of the lexical search tree may be used, if desired.

Figure 6:
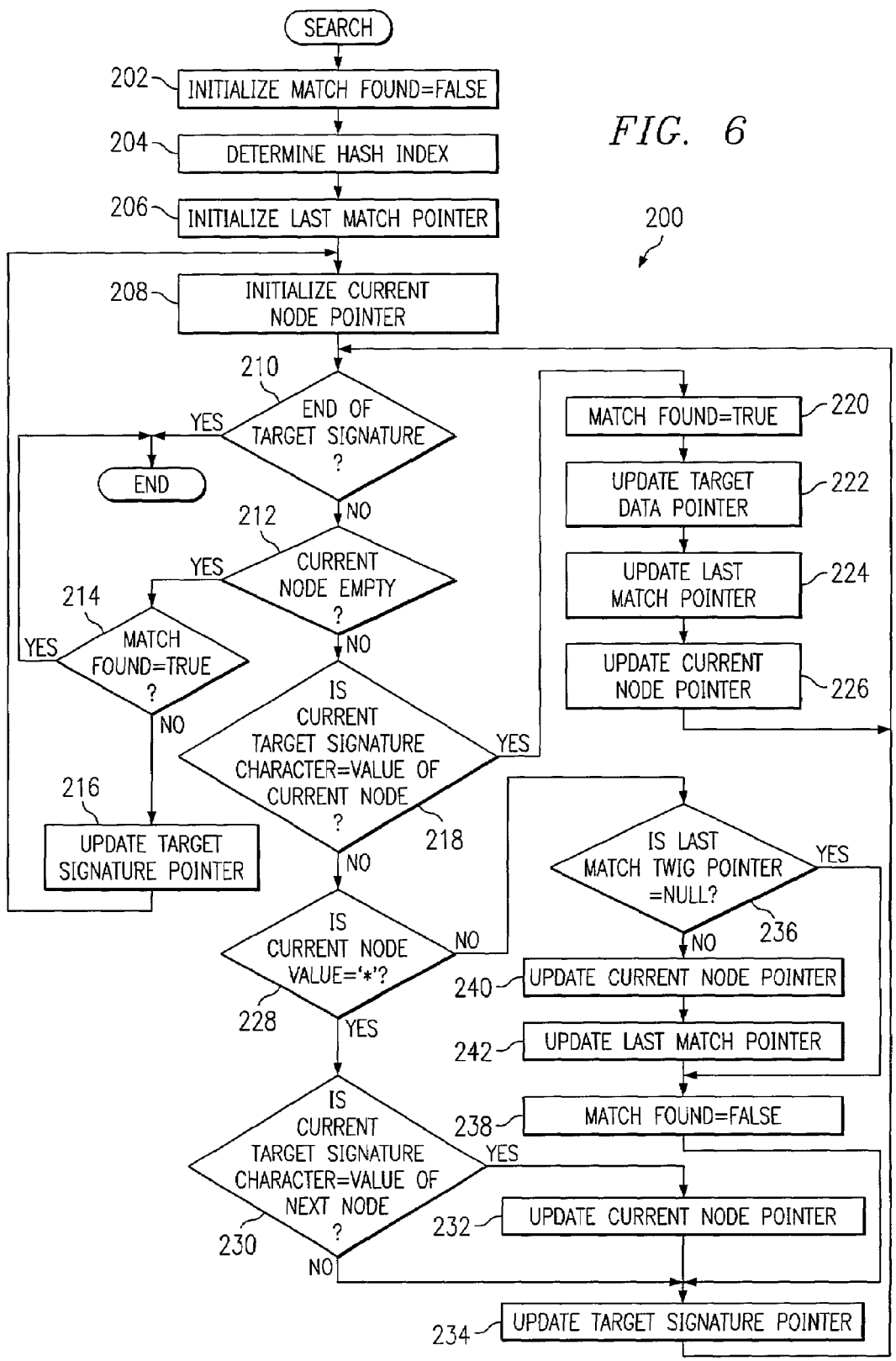
FIG. 6 is a flowchart of a method for searching the lexical search tree data structure according to a preferred embodiment of the present invention.

FIG. 6 is a flowchart of a method for searching a lexical search tree data structure for a target signature, for example a URL received from HTTP client 12, according to a preferred embodiment of the present invention. In step 202, a Match Found flag is reset to indicate no match. In step 204, a hash index for the search character string is determined. Preferably, the hash index is the ASCII code for the first character in the target character string. In step 206, a last match pointer is initialized preferably to point to the root node corresponding to the first character in the target character string. This may be done, for example, by initializing the last match pointer to point to the entry in the index table for the determined hash value. In step 208, a current node pointer is initialized, preferably to point to the root node corresponding to the first character in the target character string. Also, if desired, a signature pointer may be initialized, preferably to point to the first character in the target signature.

In step 210, a determination is made as to whether the end of the target signature has been reached. If the end of the target signature has not been reached then in step 212, a determination is made as to whether the current node is empty. A NULL value for the current node pointer may indicate an empty current node. If the current node is not empty then in step 218, a determination is made as to whether the value of the current node is equal to the value of the character pointed to by the target signature pointer. If the current node value is equal to the value of the character pointed to by the target signature pointer, then in step 220, the Match Found flag is set indicating a match. In step 222, the target signature pointer is updated, preferably to point to the next character in the target signature. In step 224, the last match pointer is updated, preferably to point to the current node. In step 226, the current node pointer is updated, preferably to point to the next node, thereby making the next node the current node. Thus, in steps 224 and 226, the last match pointer is updated to point to the current node and the current node pointer is updated to point to the next node in the lexical search tree.

If in step 212 it is determined that the current node is empty, then in step 214 a determination is made as to whether the Match Found flag is set. If the Match Found flag is set, then this along with the other conditions discussed above indicates that a match was found between the target signature and a signature in the lexical search tree. If Match Found is not set, then in step 216, the target signature pointer is updated, preferably to point to the next character in the target signature and the operation starting at step 208 is repeated.

A signature, for example a URL, in the lexical search tree may include a wild card character, such as an asterisk. An exemplary signature including a wild card character may look like "abc*.exe". The preferred embodiment of the present invention allows wild card character processing. Thus, if the target signature is "abcdefg.exe" an exact match for the target signature may not be found in the lexical search tree. However, because in a preferred embodiment, the present invention allows wild card processing, in the above example the result of the search of the lexical tree would indicate that a match was found.

If in step 218, a determination is made that the value of the current node is not equal to the value of the character pointed to by the target signature pointer, then in step 228, a determination is made as to whether the current node value is equal to the value of the wild card character. In step 230, a determination is made as to whether the value of the character pointed to by the target signature pointer is equal to the value of the next node, i.e. the leaf node of the current node. In step 232, the current node pointer is updated preferably to point to the leaf node of the next node, thereby making the leaf node of the next node the current node. In step 234, the target signature pointer is updated, preferably to point to the next character in the target signature and the process starting at step 210 is repeated.

If in step 228, it is determined that the current node value is not equal to the wild card character, then the twigs starting at the current node are searched. In step 236, a determination is made as to whether the twig pointer of the node pointed to by the last match pointer is equal to NULL. A twig pointer value that is not NULL indicates that there are twigs that diverge from the node. In step 240, the current node pointer is updated, preferably to point to the twig node of the node pointed to by the last match pointer. In step 242, the last match pointer is updated, preferably to point to the current node. In step 238, the Match Found flag is reset and the process starting at step 234 is repeated.

The hashing technique used in the preferred embodiment allows easy identification of the root node in the lexical search tree which corresponds to the first character of the target signature, for example the URL received from HTTP client 12. Thus, all the root nodes do not have to be searched to determine if there is a match between the first character of the target signature and the first character of any of the signatures represented by the lexical search tree.

A single scan of the target signature enables determination of whether the target signature matches any of a plurality of signatures which are represented by the lexical search tree. Moreover, in the preferred embodiment of the present invention wild card searching is supported thereby reducing the number of signatures that need to be stored in the lexical search tree.

Embodiments of the present invention, or parts thereof, may be stored on a storage medium. The storage medium may be stored, for example on web server 16 or URL filter 18. The storage medium may have stored thereon instructions which can be used to program a computer to perform the methods according to the present invention. The storage medium may be part of the computer or may be separate from the computer and may include, but is not limited to, any type of disk including floppy disks, optical disks, CD-ROMS, DVDs, magneto-optical disks, ROMs, RAMs, EPROMs, EEPROMs, or any type of media suitable for storing electronic instructions.

What is claimed is:

1. A method for Uniform Resource Locator (URL) filtering, comprising:
receiving a request to process a URL in a desired manner;
receiving an event notification upon the occurrence of an event associated with a received URL;
searching, in response to said event notification, a lexical search tree data structure storing a plurality of URLs for said received URL to determine whether said received URL is hostile;
processing said received URL in said desired manner in response to said received URL not matching any of said plurality of URLs stored in said lexical search tree data structure; and
detecting an intrusion of said received URL and denying said request to said received URL in said desired manner in response to said receiver URL being hostile and matching any of said plurality of URLs stored in said lexical search tree data structure.

2. The method of claim 1, wherein said searching said lexical search tree comprises:
determining a hash value for said received URL;
determining a branch associated with a root node of said lexical search tree data structure corresponding to said hash value, said branch along with said root node representing at least one URL of said plurality of URLs, said branch having one or more leaf nodes linked hierarchically to one another, each leaf node representing an element of said at least one URL; and
traversing only said branch to find a match between said at least one URL and said received URL.

3. The method of claim 2, wherein said determining a hash value comprises:
determining a first element of said received URL; and
determining a hash value for said first element.

4. The method of claim 3, said hash value being the ASCII code for said first element.

5. The method of claim 2, wherein said traversing only said branch comprises comparing successive elements of said received URL with successive elements of said at least one URL stored in successive leaf nodes of said one or more leaf nodes so long as said successive elements of said received URE match said successive elements of said at least one URL.

6. The method of claim 2, wherein said traversing only said branch further comprises:
determining a twig associated with said branch at a point of divergence between said at least one URL and said received URL, said twig representing a terminating substring of a second URL of said plurality of URLs; and
traversing said twig to find a match between a terminating substring of said received URL and said terminating substring represented by said twig.

7. The method of claim 6, wherein said traversing said twig comprises comparing successive elements of said terminating substring of said received URL with successive elements of said terminating substring of said second URL represented by said twig so long as said successive elements match.

8. The method of claim 5, wherein said traversing only said branch further comprises:
setting a current node pointer to point to a leaf node of said one or more leaf nodes;
setting a target signature pointer to point to an element of said received URL;
in response to a value of said leaf node pointed to by said current node pointer being equal to a wild card character and a value of the element pointed to by said target signature pointer being equal to a value of the next leaf node following the leaf node pointed to by said current node pointer, updating said current node pointer to point to a leaf node following said next leaf node.

9. The method of claim 1, wherein said receiving said event notification comprises receiving said event notification upon the occurrence of an event selected from the group consisting of a URL map event and a receive raw data event.

10. A system for Uniform Resource Locator (URL) filtering, comprising:
a web server operable to receive a URL request from a client; and
a filter operable, upon receiving an event notification relating to said URE request from said web server, to search a lexical search tree data structure storing a plurality of hostile URLs, said filter further operable to process said received URL in response to said received URI not matching any of said plurality of hostile URLs; and
said filter further operable to detect an intrusion of said received URL and deny said processing of said received URL in response to said received URL matching any of said plurality of hostile URLs.

11. The system of claim 10, wherein said event notification relates to an event selected from the group consisting of a URL map event and a receive raw data event.

12. The system of claim 10, further comprising:
a computer readable medium with computer program logic recorded thereon for searching said lexical search tree data structure, said computer readable medium comprising:
means for determining a hash value for said received URL;
means for determining a branch associated with a root node of said lexical search tree data structure corresponding to said hash value, said branch along with said root node representing at least one hostile URI of said plurality of hostile URLs, said branch having one or more leaf nodes linked hierarchically to one another, each leaf node representing an element of said at least one hostile URL; and
means for traversing only said branch to find a match between said at least one hostile URL and said received URL.

13. The system of claim 12, wherein said means for determining a hash value comprises:
means for determining a first element of said received URL; and
means for determining a hash value for said first element.

14. The system of claim 13, wherein said means for traversing only said branch comprises means for comparing successive elements of said received URL with successive elements of said at least one hostile URL stored in successive leaf nodes of said one or more leaf nodes so long as said successive elements of said received URL match said successive elements of said at least one hostile URL.

15. The system of claim 14, wherein said means for traversing only said branch further comprises:
means for determining a twig associated with branch at a point of divergence between said at least one hostile URL and said received URL, said twig representing a terminating substring of a second hostile URL of said plurality of hostile URLs; and means for traversing said twig to find a match between a terminating substring of said received URL and said terminating substring represented by said twig.

16. The system of claim 15, wherein said means for traversing said twig comprises means for comparing successive elements of said terminating substring of said received URL with successive elements of said terminating substring of said second hostile URL represented by said twig so long as said successive elements match.

17. A method for Uniform Resource Locator (URL) filtering, comprising:

receiving an event notification from a web server upon the occurrence of a URL map event;

determining, in response to receiving said event notification, a hash value for a URL received by said web server from a client;

determining a branch associated with a root node of a lexical search tree data structure corresponding to said hash value, said lexical search tree data structure storing a plurality of hostile URLs, said branch along with said root node representing at least one hostile URL of said plurality of hostile URLs, said branch having one or more leaf nodes linked hierarchically to one another, each leaf node representing an element of said at least one hostile URL;

traversing only said branch to find a match between said received URL and said at least one hostile URL;

processing said received URL in response to said received URL not matching said at least one hostile URL; and denying said processing of said receiving URL in response to said received URL matching said at least one hostile URL.

18. The system of claim 17, said receiving said event notification comprising receiving a notification parameter from said web server, said notification parameter pointing to a data structure storing said received URL.

19. The system of claim 17, further comprising notifying said web server of a match between said received URL and said at least one hostile URL.

20. The system of claim 17, further comprising: registering with a web server to receive notification upon the occurrence of said URL map event.

21. The method of claim 1, wherein said received URL request is hostile when the received URL request requests access to data that is not intended to be accessible over a public network.

* * * * *

UNITED STATES PATENT AND TRADEMARK OFFICE
CERTIFICATE OF CORRECTION

PATENT NO. : 7,472,167 B2  Page 1 of 1
APPLICATION NO. : 10/004192
DATED : December 30, 2008
INVENTOR(S) : Richard P. Tarquini It is certified that error appears in the above-identified patent and that said Letters Patent is hereby corrected as shown below:

In column 9, line 53, in Claim 5, delete "URE" and insert -- URL --, therefor.

In column 10, line 23, in Claim 10, delete "URE" and insert -- URL --, therefor.

In column 10, line 26, in Claim 10, delete "URI" and insert -- URL --, therefor.

In column 10, line 44, in Claim 12, delete "URI" and insert -- URL --, therefor.

Signed and Sealed this

Twenty-first Day of April, 2009

JOHN DOLL
*Acting Director of the United States Patent and Trademark Office*